United States Patent [19]

Nicholls

[11] 4,079,922
[45] Mar. 21, 1978

[54] VEHICLE SUSPENSION UNITS

[75] Inventor: Lawrence George Nicholls, Birmingham, England

[73] Assignee: Girling Limited, Birmingham, England

[21] Appl. No.: 687,553

[22] Filed: May 18, 1976

[30] Foreign Application Priority Data

May 28, 1975 United Kingdom ............... 23273/75

[51] Int. Cl.$^2$ .......................... B60E 17/00; F16F 5/00
[52] U.S. Cl. ..................................... 267/8 R; 267/34
[58] Field of Search ................. 267/8 R, 34, 177, 121; 280/697, 698, 708, 710

[56] References Cited

U.S. PATENT DOCUMENTS

| 2,756,045 | 7/1956 | Savory | 267/8 R |
| 3,251,591 | 5/1966 | McNally | 267/34 |
| 3,603,575 | 9/1971 | Arlasky et al. | 267/34 |
| 3,877,687 | 4/1975 | Sarti | 267/34 |

Primary Examiner—James B. Marbert
Attorney, Agent, or Firm—Scrivener, Parker, Scrivener and Clarke

[57] ABSTRACT

A suspension unit comprising a telescopic damper with a surrounding coil spring has a rotatable cam sleeve, an intermediate sleeve and a fixed end sleeve, the latter two sleeves being adjustable relative to each other both angularly and axially, but normally providing a fixed reaction for normal adjustment of the spring length by rotation of the cam sleeve, which may be of identical form to the intermediate sleeve, each having an axial cam profile at one end and axially extending projections of different lengths at its other end.

4 Claims, 3 Drawing Figures

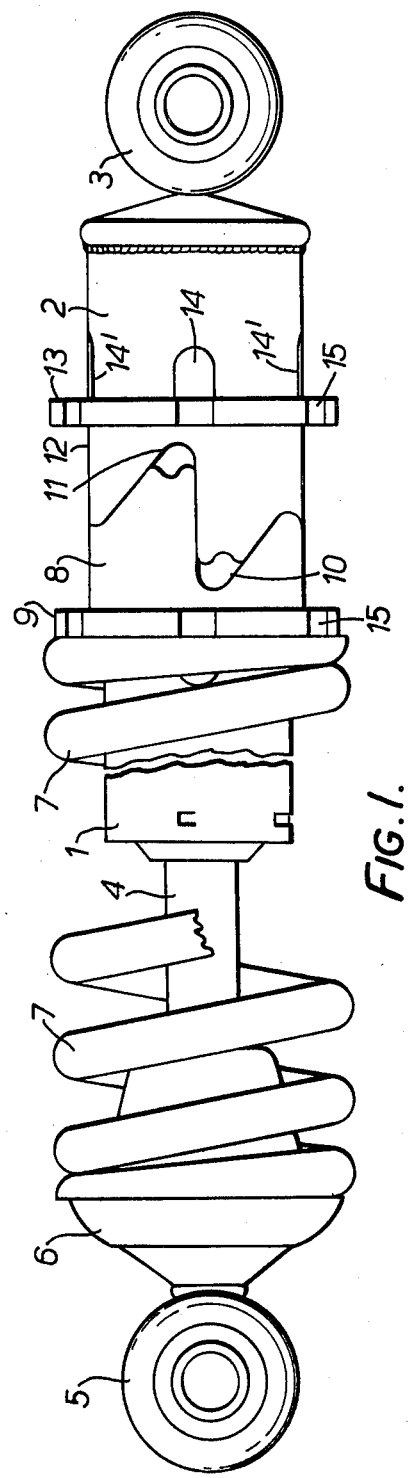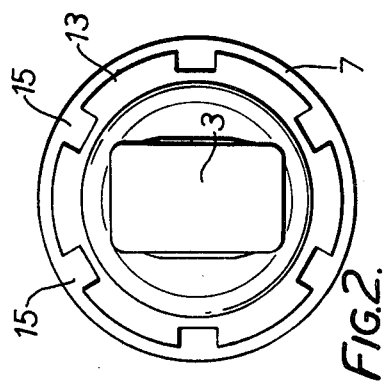
FIG. 1.
FIG. 2.

VEHICLE SUSPENSION UNITS

This invention relates to vehicle suspension units comprising a telescopic hydraulic damper and a coil compression spring fitted over the body of the damper and abutting at one end against a stop on the piston rod of the damper and at its other end against a cam sleeve rotatably surrounding the damper body and reacting against an abutment fast with the body in such a manner that the cam sleeve is rotatable relative to the body to its axial spacing from the abutment and thereby adjust the length of the spring.

Units of this form are, for example, employed in pairs to provide an adjustable suspension for the rear wheels of motor cycles, and are described in British Pat. Specifications No. 1,267,513 and 713,214, in each of which the cam sleeve co-operates with fixed lugs welded to the outer tube of a twin tube damper. The degree of adjustment thus provided is adequate for any given motorcycles for which the unit is designed, but the present invention seeks to increase the versatility of units of this general form to suit them for different operational requirements.

At the same time, the invention guards against the risk of localised deformation of the damper body such as might interfere with proper operation of the damper arising out of the use of the fixed lugs mentioned above. In the above-mentioned specifications, the units comprise twin tube dampers, and slight deformation of the outer tube is not critical, but welded lugs of the type there described could not be used on monotube dampers without a severe risk that local distortion would prevent free movement of the damper piston through the body.

In accordance with the invention, the said abutment is constituted by a fixed sleeve surrounding and secured to the damper body at the closed end thereof, remote from the piston rod, and an intermediate cam sleeve is rotatably mounted on the body, between the cam sleeve and the fixed sleeve, the intermediate sleeve being keyed against rotation relative to the fixed sleeve, in any one of at least two different axial positions relative to the fixed sleeve.

Thus, in addition to the degree of adjustment provided by rotation of the cam sleeve, the intermediate sleeve can be set in different positions to provide a further degree of adjustment which will normally be effected on initial assembly of the adjuster.

Since the fixed sleeve is secured to the end of the damper body, it can be welded (or otherwise secured) without interfering with the working stroke of the piston even in a monotube damper. The necessary keying and adjustment of the intermediate sleeve relative to the fixed sleeve is conveniently and preferably obtained by the provision of respective, axially extending projections and recesses at the adjacent ends of the said sleeves, the projections and recesses being dimensioned to define the different axial positions of the parts corresponding to their different angular positions.

The cam sleeve and intermediate sleeve are preferably of substantially identical form, so as to be interchangeable with each other, thus rationalizing production of the components and assembly of the units.

A suspension unit in accordance with the invention will now be described, by way of example, with reference to the accompanying drawings, in which:

FIG. 1 is a side elevation of the unit;

FIG. 2 is an end view, and

Figure 3:
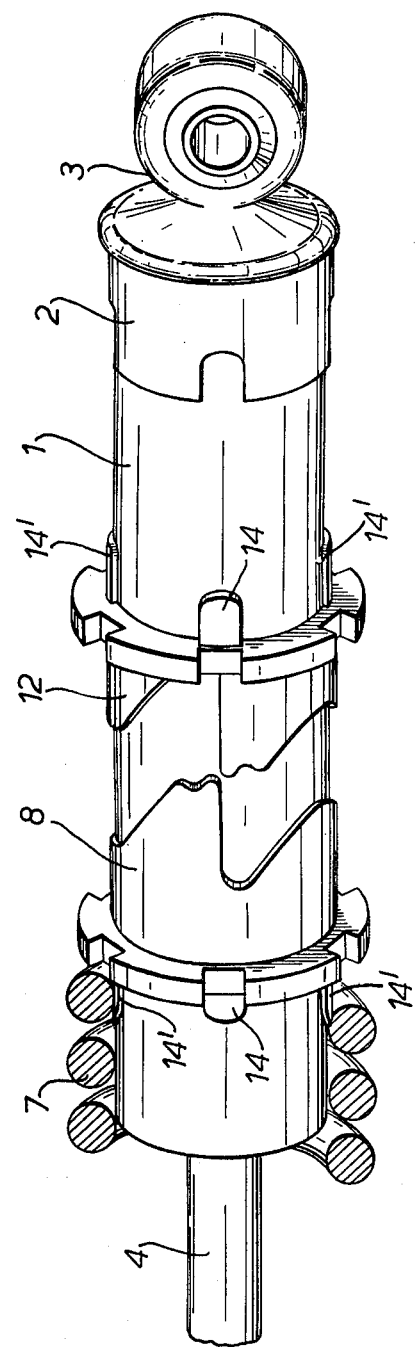
FIG. 3 is a perspective view of the unit showing the cam and intermediate sleeves loosely assembled on the damper body.

The unit shown in the drawings comprises a monotube damper having a body or damper tube 1 provided at one end with a fixed sleeve 2 and an end cap with a connection eye 3 made fast with each other and with the tube 1 by welding around the abutting end faces of the sleeve 2 and end cap. A piston rod 4 carries a connection eye 5 and a collar 6 forming a stop for one end of a coil compression spring 7, whose other end abuts a rotatable cam sleeve 8 having at one end a flange 9 and at its opposite end a cam profile 10 for co-operation with a generally complementary profile 11 of an identical intermediate sleeve 12. The sleeve 12 has a flange 13 and equi-spaced, axially projecting fingers 14 and 14' located in corresponding recesses in the support tube 2, whereby to key the sleeve 12 against rotation relative to the tubes 1 and 2. The corresponding fingers 14, 14' on the cam sleeve 8 assist in locating and centralising the adjacent end of the spring 7.

The cam profiles 10 and 11 are shaped to provide three distinct axial spacings of the two adjustor sleeves by relative angular adjustment of the sleeves, which adjustment is effected with the assistance of a C-spanner co-operating in recesses 15 in the flange 9 of the sleeve 8.

A further degree of adjustment is provided by virtue of the fact that two fingers 14' have a greater axial length than the other two fingers 14, so that the second sleeve 12, has two possible positions of adjustment relative to the fixed sleeve 2, these positions being spaced apart angularly by 90° and axially by the difference in the lengths of fingers 14 and 14'. This degree of adjustability is available on initial assembly rather than in normal service, although it will obviously be possible to effect this form of adjustment if desired during the working life of the unit.

It will be readily appreciated that by making the cam sleeve and intermediate sleeve as identical components, production of these components is rationalized and assembly is simplified.

Another advantage of the illustrated unit is that the fixed sleeve 2, which is formed as a simple machining or pressing provides a smooth and uniform cylindrical surface against which a sealing shroud on a gas pressurising apparatus can seat properly for gas charging of the unit through a charging port, not shown, in the end cap of the unit.

I claim:

1. In a vehicle suspension unit comprising a telescopic damper having a damper body with a closed end, and a piston rod extending through the opposite end of said body, a coil compression spring surrounding said piston rod and damper body, a stop on said piston rod abutted by one end of said spring and a cam sleeve rotatably mounted on said body and abutted by the other end of said spring, said cam sleeve being rotatable for adjusting the length of said spring, the improvement which comprises a fixed sleeve surrounding and secured to said closed end of said damper body, and an intermediate sleeve freely surrounding said damper body, said intermediate sleeve having co-operative engagement with said cam sleeve, and keying means on said intermediate sleeve and said fixed sleeve to key said intermediate sleeve against rotation relative to said fixed sleeve in any one of at least two different angular and axial positions of said intermediate sleeve relative to said fixed sleeve.

2. The suspension unit of claim 1, wherein said keying means comprise a group of axial projections on one of said sleeves and a group of co-operating axial recesses on the other of said sleeves, at least one of said groups being of different axial dimensions inter se.

3. The suspension unit of claim 1, wherein said intermediate sleeve and said cam sleeve are substantially identical in form so as to be interchangeable with each other.

4. The suspension unit of claim 1, wherein said intermediate sleeve and said cam sleeve are of substantially identical form, each having at one axial end thereof an axial cam profile and at the opposite axial end thereof a group of axial projecting fingers, said fingers of said intermediate sleeve constituting one part of said keying means.

* * * * *